(12) United States Patent
Rogers et al.

(10) Patent No.: US 12,222,684 B2
(45) Date of Patent: *Feb. 11, 2025

(54) SLOTTED TIMER

(71) Applicant: Time Timer, LLC, Cincinnati, OH (US)

(72) Inventors: David M. Rogers, Cincinnati, OH (US); Tricia L. Wright, San Francisco, CA (US)

(73) Assignee: Time Timer, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,353

(22) Filed: Feb. 7, 2024

(65) Prior Publication Data

US 2024/0176306 A1    May 30, 2024

Related U.S. Application Data

(63) Continuation of application No. 16/750,348, filed on Jan. 23, 2020, now Pat. No. 11,934,155, which is a
(Continued)

(51) Int. Cl.
  *G04F 3/06*       (2006.01)
  *G09B 19/00*     (2006.01)
  *G09B 19/12*     (2006.01)

(52) U.S. Cl.
  CPC ............. *G04F 3/06* (2013.01); *G09B 19/12* (2013.01); *G09B 19/0084* (2013.01)

(58) Field of Classification Search
  CPC ...... G04F 3/06; G04F 5/02; G04F 3/00; G04F 3/033; G04F 3/025; G04F 3/02;
  (Continued)

(56) References Cited

U.S. PATENT DOCUMENTS

| | | | | |
|---|---|---|---|---|
| 272,737 | A * | 2/1883 | McLewee | G04B 37/1473 40/728 |
| 755,969 | A * | 3/1904 | Thrasher | G04B 19/202 368/233 |

(Continued)

FOREIGN PATENT DOCUMENTS

| | | |
|---|---|---|
| EM | 002013763-001 | 6/2012 |
| EM | 002013763-002 | 6/2012 |

(Continued)

OTHER PUBLICATIONS

Rogers, David M., Declaration of David M. Rogers, Jul. 22, 2020, 20 pgs., Cincinnati, Ohio, USA.
(Continued)

*Primary Examiner* — Edwin A. Leon
*Assistant Examiner* — Kevin Andrew Johnston
(74) *Attorney, Agent, or Firm* — Wood Herron & Evans LLP

(57) ABSTRACT

A slotted timer teaches time in a simple manner to those having difficulty understanding the concept of time. The timer rotates a shaft which rotates a colored disk attached to the shaft. The initial position of the colored disk is manually set by an operator using a card residing in a slot extending across the top of the timer. The card may illustrate an activity to be completed in a time period set by the operator. Different cards may be used to indicate different activities.

20 Claims, 10 Drawing Sheets

Related U.S. Application Data continuation-in-part of application No. 29/721,307, filed on Jan. 20, 2020, now Pat. No. Des. 956,581, and a continuation-in-part of application No. 29/721,308, filed on Jan. 20, 2020, now Pat. No. Des. 956,582, and a continuation-in-part of application No. 29/719,897, filed on Jan. 8, 2020, now Pat. No. Des. 912,551.

(58) Field of Classification Search
CPC .......... G04F 3/022; G09B 1/02; G09B 19/12; G09B 19/0084
USPC .............................. D10/14–15, 27; 368/101
See application file for complete search history.

(56) References Cited

U.S. PATENT DOCUMENTS

| | | | | |
|---|---|---|---|---|
| 1,272,448 | A | * | 7/1918 | Howe ................ G04B 37/0066 248/114 |
| 2,011,517 | A | | 8/1935 | Geoffrion |
| 2,324,833 | A | | 7/1943 | Gold |
| 2,329,447 | A | | 9/1943 | Ludwig |
| 2,336,563 | A | | 12/1943 | Nielsen |
| 2,816,373 | A | | 12/1957 | Caddy |
| 2,853,804 | A | | 9/1958 | Bengeyfield |
| 3,608,214 | A | | 9/1971 | Rancati |
| 3,668,858 | A | | 6/1972 | Hartwig |
| 3,803,831 | A | | 4/1974 | Horzick |
| 4,306,368 | A | | 12/1981 | Coghill et al. |
| 4,307,534 | A | | 12/1981 | Tomita et al. |
| 4,885,731 | A | | 12/1989 | Massaro |
| 4,993,006 | A | | 2/1991 | Oshima et al. |
| D321,141 | S | | 10/1991 | Aikawa |
| D369,619 | S | | 5/1996 | Rogers |
| 5,646,913 | A | | 7/1997 | Quesenberry et al. |
| 5,654,940 | A | | 8/1997 | Wei et al. |
| 5,662,479 | A | | 9/1997 | Rogers |
| 6,158,868 | A | | 12/2000 | Chien et al. |
| 6,359,840 | B1 | | 3/2002 | Evans et al. |
| 6,392,963 | B1 | | 5/2002 | McGinnis-Smith et al. |
| 6,683,821 | B1 | | 1/2004 | Emtyazi |
| D504,827 | S | * | 5/2005 | Lavoie ........................... D10/23 |
| D583,686 | S | | 12/2008 | Forakis |
| D671,016 | S | | 11/2012 | Rogers et al. |
| D686,093 | S | | 7/2013 | Wright et al. |
| D705,089 | S | | 5/2014 | Rogers et al. |
| D770,310 | S | | 11/2016 | Rogers et al. |
| D785,471 | S | | 5/2017 | Rogers et al. |
| D796,349 | S | | 9/2017 | Rogers et al. |
| 10,303,123 | B1 | | 5/2019 | Rogers et al. |
| 2003/0174586 | A1 | | 9/2003 | Hon |
| 2004/0008589 | A1 | | 1/2004 | McMillan |
| 2008/0022565 | A1 | | 1/2008 | Sandy et al. |
| 2010/0220554 | A1 | | 9/2010 | Endresik et al. |
| 2014/0219065 | A1 | | 8/2014 | Novak et al. |
| 2015/0134343 | A1 | | 5/2015 | Kluger et al. |

FOREIGN PATENT DOCUMENTS

| | | |
|---|---|---|
| EM | 002140608-001 | 3/2013 |
| EM | 002140608-002 | 3/2013 |
| EM | 002140608-003 | 3/2013 |
| EM | 002140608-004 | 3/2013 |
| EM | 002140608-005 | 3/2013 |
| EP | 3483662 B1 | 12/2019 |
| FR | 2726099 A1 | 4/1996 |
| FR | 2752069 A1 | 2/1998 |
| KR | 200465772 | 3/2013 |

OTHER PUBLICATIONS

Deercy Digital Kitchen Timer—posted at amazon.com Jan. 14, 2016 © 1996-2018, Amazon.com, Inc [online][site visited Jul. 2, 2018]. Available from internet: <https://www.amazon.com/DEERCY-Digital-Kitchen-Display-Simplest/dp/B06WGYZW8R> (Year: 2016).

Taylor Rotating Timer Kitchen I posted at amazon.conn Mar. 2015 © 1996-2018, Amazon.com, Inc [online][site visited Jul. 2, 2018] Available from internet: <https://www.amazon.conn/Taylor-Precision-Products-Mechanical-Rotating/dp/B00UKIOKRG/ref=sr_1_8?s=kitchen&srs=9503531011&ie=UTF8&qid=1530552102&sr=1-8> (Year: 2015).

Visual Schedule Kit for the Time Timer, published in 2014, Time Timer, full document (Year: 2014).

European Patent Office, Search Report and Opinion, mailed Mar. 26, 2019, 5 pgs., European Patent Office, Munich, Germany.

Speechie Speaking, "Review of Time Timer," Dec. 1, 2011, Youtube, retrieved from <https://www.youtube.com/watch?v=PGNeZvWWWwlg> on Jan. 14, 2023, full document (Year: 2011).

Lescure, Francois, English Translation of FR 2726099, originally published Apr. 26, 2014, retrieved from Espacenet on Jan. 14, 2023, full document (Year: 2014).

Kim, Dong Ha et al., English Translation of KR 101425322, originally published Aug. 1, 2014, retrieved from Espacenet on Jan. 14, 2023, full document (Year: 2014).

English Transaltion of KR200465772, originally published on Mar. 15, 2013, retrieved from Espacenet on Jul. 6, 2023, full document (Year: 2013).

Boulet, Pierre, FR 2752069, originally published Feb. 6, 1998, retrived from Espacenet on Jul. 6, 2023, full document (Year: 1998).

* cited by examiner

SLOTTED TIMER

CROSS REFERENCE TO RELATED APPLICATIONS

This application is a continuation of U.S. patent application Ser. No. 16/750,348 filed Jan. 23, 2020. U.S. patent application Ser. No. 16/750,348 is a continuation-in-part of U.S. Design patent application Ser. No. 29/719,897 filed Jan. 8, 2020, now U.S. Pat. No. D912,551, and a continuation-in-part of U.S. Design patent application Ser. No. 29/721,307 filed Jan. 20, 2020, now U.S. Pat. No. D956,581, and a continuation-in-part of U.S. Design patent application Ser. No. 29/721,308, now U.S. Pat. No. D956,582, filed Jan. 20, 2020. Each of these applications is fully incorporated by reference herein.

FIELD OF THE INVENTION

This invention relates generally to an apparatus and method for teaching time and, more particularly, to an apparatus and method of displaying remaining and elapsed time.

BACKGROUND OF THE INVENTION

Numerous timers show elapsed time in a visual form. U.S. Pat. No. 5,662,479 discloses a timer which discloses a disk which rotates to visualize the amount of time left from a sixty-minute period. As the disk rotates, the visible portion of the disk decreases, indicating to the user that a certain amount of time remains from the original time. The timer must be manually set at the beginning of the time period for any activity. An operator may have difficulty knowing at which time to set the timer based on an activity. For example, an operator may not know whether to set the timer to ten minutes or twenty minutes for an activity, such as getting dressed for school.

Therefore, it would be desirable for a timer to display an image of an activity so an operator may set the timer correctly initially. There is a need for a visual timer having a place for cards to display certain activities.

There is further a need for a visual timer using a rotating disk which may display a predetermined time along with an image of an activity.

There is further a need for a visual timer using a rotating disk which may display an image of an activity along with a predetermined time necessary to complete the activity.

SUMMARY OF THE INVENTION

According to one aspect of the invention, a slotted timer for displaying remaining and elapsed time comprises a generally rectangular body having a generally rectangular front tray and a generally rectangular rear tray secured to the generally rectangular front tray. The generally rectangular front tray of the generally rectangular body has a recess.

The generally rectangular body has a battery compartment for storing at least one battery. The at least one battery powers a control module located between the generally rectangular front and rear trays of the generally rectangular body. The control module includes a shaft which rotates at a predetermined speed.

A rotatable colored disk is secured to the shaft, such that the rotatable colored disk rotates with the shaft. A background member is secured in the recess of the generally rectangular front tray in front of the rotatable colored disk. The background member has a slit through which a portion of the rotatable colored disk passes, such that a portion of the rotatable colored disk is visible to the user. Upon rotation of the shaft and expiration of time, a portion of the rotatable colored disk rotates behind the background member and becomes invisible to the user. In the preferred embodiment, the shaft and rotatable colored disk rotate in a clockwise direction as time elapses. However, the shaft and rotatable colored disk may rotate in the counterclockwise direction as time passes. A lens may be secured to the generally rectangular front tray in front of the background member.

The background member has numerical indicia marks outside the colored disk when the colored disk is visible in front of the background member. The background member has a slit through which the colored disk passes upon rotation of the shaft and colored disk, such that upon rotation of the shaft with time, a portion of the colored disk rotates in front of the background member.

A positioner is secured to the shaft in front of the lens to enable a user to manually set the initial position of the rotatable colored disk inside the lens to indicate a desired time to be elapsed.

A slot extends along an upper surface of the generally rectangular body of the timer. The slot is typically linear and adapted to removably receive and retain a card which may illustrate an activity. The card displaying an activity may have a time printed on the card indicating to the operator which initial time to set the timer. A card displaying an activity may not have a time printed on the card in which case the operator may set the time period as desired to perform the illustrated activity. The card may be single or double sided. The card may be a dry erase board so any activity may be drawn on the card.

In a second aspect, a combination timer and card may comprise the invention. The card may be sold with the timer or separately. The timer may be a battery powered timer having a colored disk which rotates as time elapses. A visible portion of the colored disk may become smaller as time elapses. The battery powered timer has a slot extending along an upper surface of the battery powered timer, the slot being adapted to removably receive and retain a card for assisting an operator position a traveling edge of the colored disk. The slot is preferably linear, but may be another shape.

The card is removably secured in the slot. The card indicates to an operator at which time to manually set the position of the colored disk using a positioner of the timer. The card may have a digital time printed thereon. The card may be a single-sided card or a double-sided card. The card may be a dry erase board which may be written upon.

In a third aspect, a timer and card may be combined and sold together. One or more cards may be sold with the timer or separately. The timer may have a colored disk which rotates as time elapses. A visible portion of the colored disk may become smaller as time elapses. The timer has a slot extending along an upper surface of the timer. The slot is adapted to removably receive and retain a card for assisting an operator to initially position a traveling edge of the colored disk. The slot is preferably linear, but may be another shape.

The card is removably secured in the slot and may be any desired size and shape. For example, the card may be less wide than the slot of the timer. The card indicates to an operator at which time to manually set the position of the colored disk using a positioner of the timer. The card may have a digital time printed thereon. The card may be a single-sided card or a double-sided card. The card may be a dry erase board which may be written upon.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
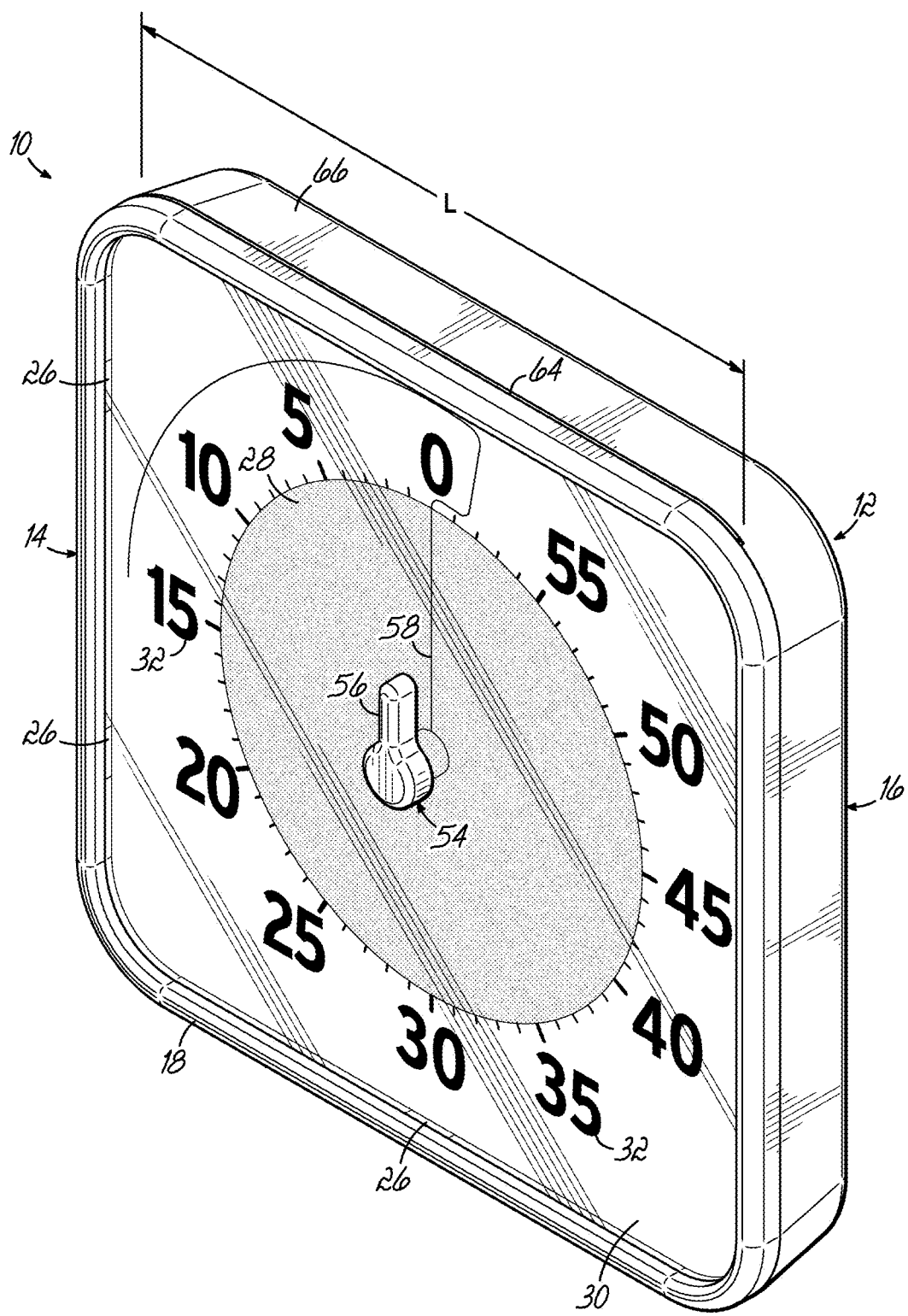
FIG. 1 is a front perspective view of a slotted timer.
Figure 3:
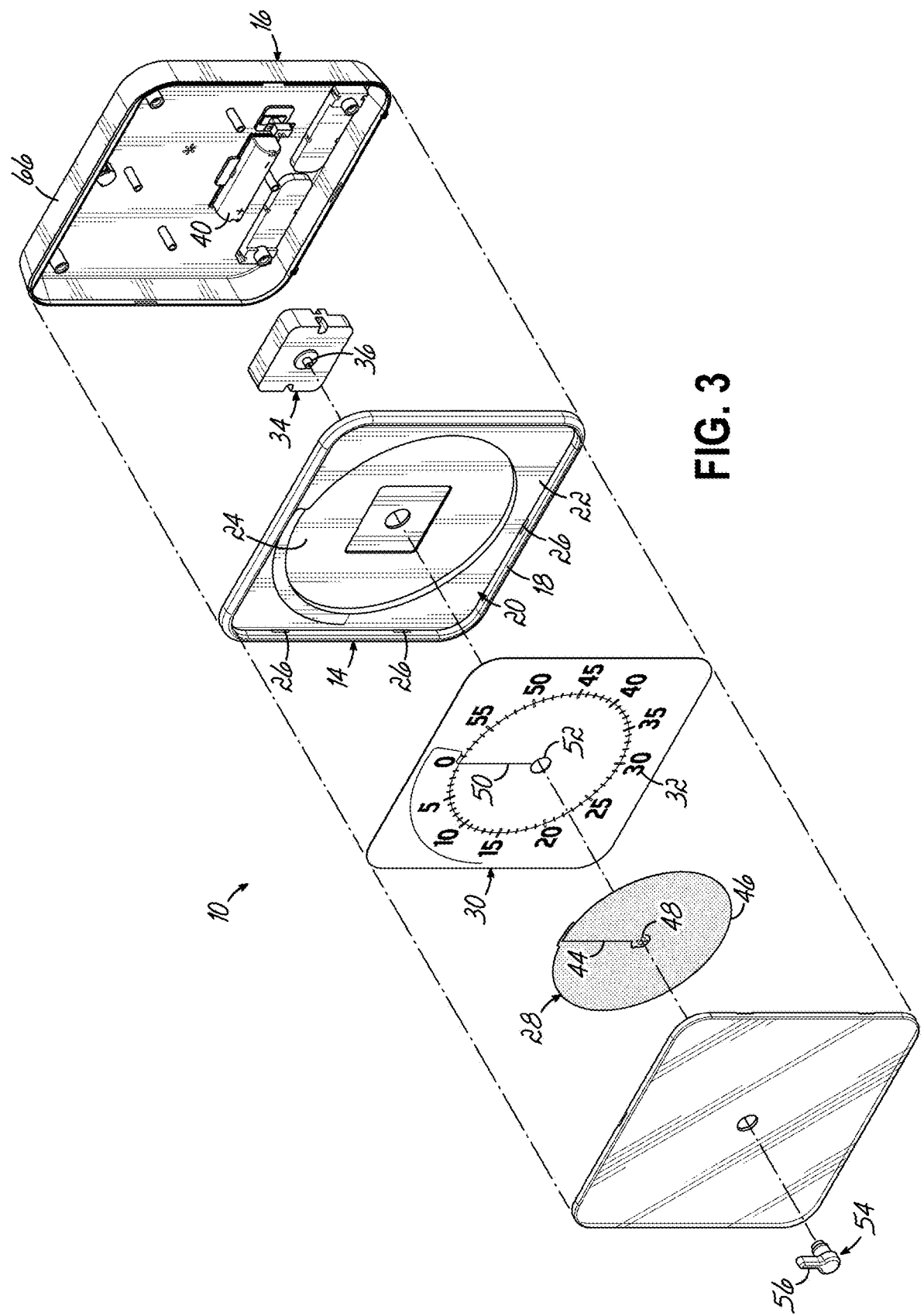
FIG. 3 is a partially disassembled view of the slotted timer of FIG. 1.
Figure 4:
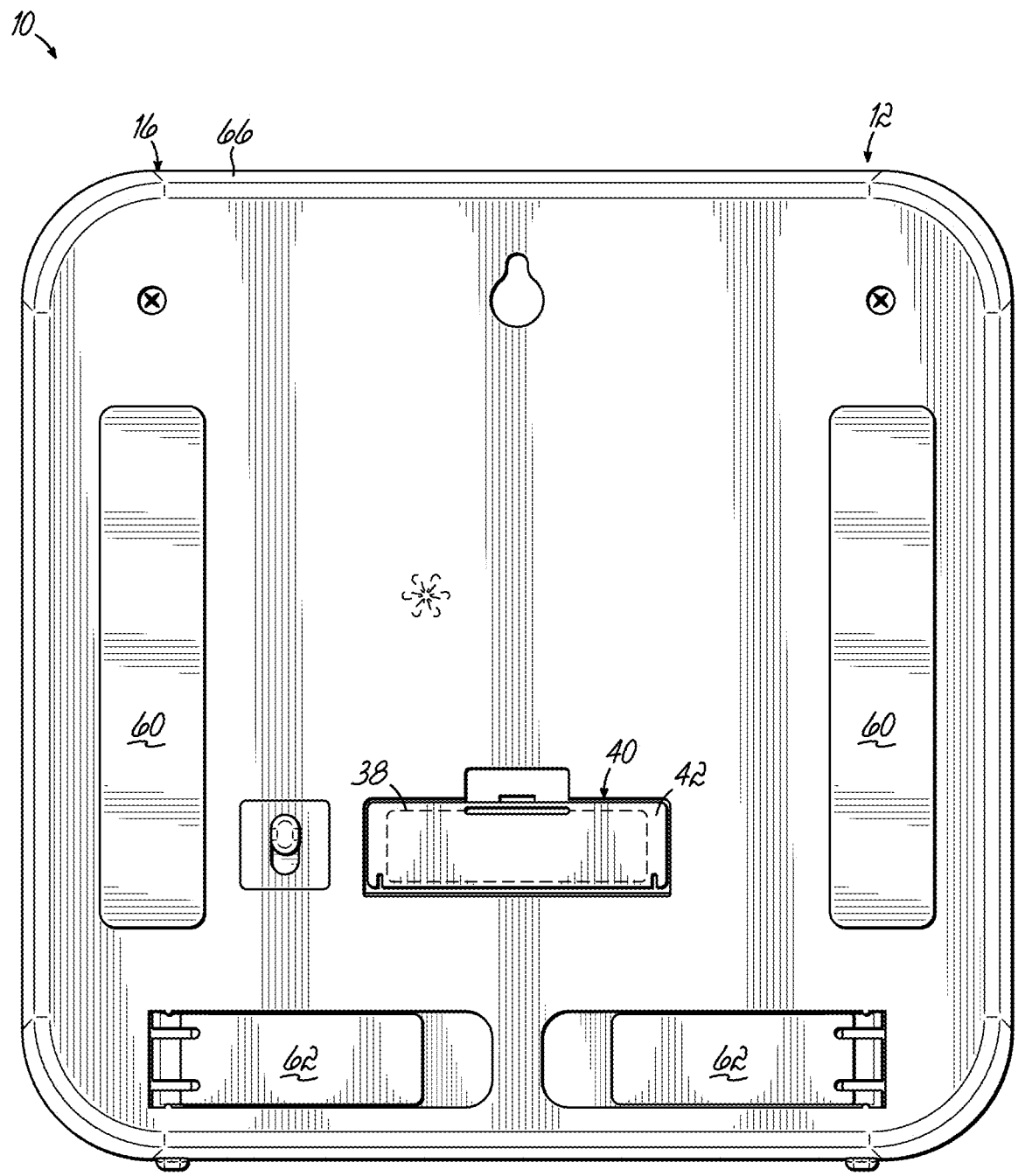
FIG. 4 is a rear view of the slotted timer of FIG. 1.

Referring first to FIG. 1, there is illustrated a slotted timer 10 incorporating the principles of the present invention. As best shown in FIG. 3, the slotted timer 10 comprises a generally rectangular body 12, including a generally rectangular front tray 14 and a generally rectangular rear tray 16. For purposes of this document, the term "tray" is not intended to be limited by the drawings herein or any dictionary definition. As best shown in FIGS. 3 and 4, when assembled, the front and rear trays 14, 16 are secured together with any conventional means, including fasteners.

As best shown in FIG. 3, the front tray 14 of the slotted timer 10 is a unitary molded plastic piece having a border 18 around the perimeter of a recess 20 having a floor 22. The border 18 extends forwardly from the floor 22. The floor 22 has a circular cavity 24 in which a colored disk 28 rotates, as described below.

Figure 2:
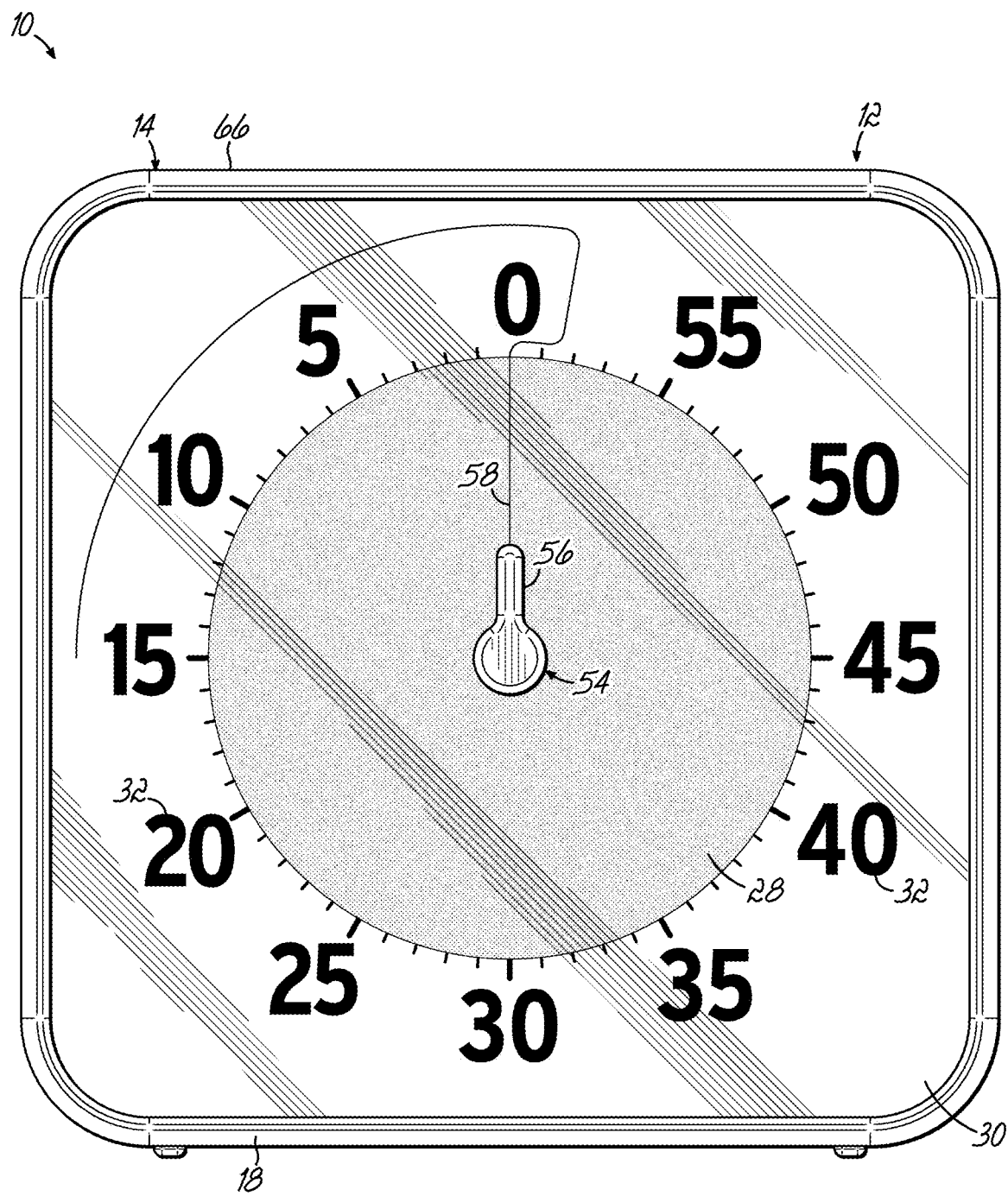
FIG. 2 is a front view of the slotted timer of FIG. 1.

As best shown in FIG. 3, the border 18 has holders 26 integrally formed therein which function to hold a background member 30 and a lens (not shown) inside recess 20 as described below. The background member 30 has numerical indicia 32 printed thereon. Although one set of numbers is illustrated, any other numbers or symbols may be printed on the background member 30. As best shown in FIG. 2, the numerical indicia 32, including numbers and line segments representing time increments, are displayed outside the colored disk 28 even when the colored disk 28 is fully shown or exposed.

As best shown in FIG. 3, a control module 34 is held between the generally rectangular front tray 14 and the generally rectangular rear tray 16 in any known manner. The control module 34 includes a rotatable shaft 36 which rotates at a predetermined speed. As best shown in FIG. 3, the control module 34 is powered by at least one battery 38. The at least one battery 38 is held in a compartment 40 shown in FIG. 3 formed in the rear tray 16. As best shown in FIG. 4, the compartment 40 has a door 42 which may be removed to change a battery or batteries.

As best shown in FIG. 3, the circular-shaped colored disk 28 rotates in the circular cavity 24 of the floor 22 of the generally rectangular front tray 14. The colored disk 28 has a slit 44 extending inwardly from an outer edge 46 to a central opening 48. The central opening 48 is sized such that the rotatable shaft 36 of the control module 34 fits through the central opening 48. Because the colored disk 28 is secured to the rotatable shaft 36, they rotate at the same rate or speed. Thus, one full rotation of the rotatable shaft 36 equals one full rotation of the colored disk 28.

In front of the rotatable colored disk 28 is the background member 30 secured in the recess 20 of the generally rectangular front tray 14. The background member 30 has a slit 50 extending outwardly from a central opening 52. The central opening 52 is sized to allow the rotatable shaft 36 of the control module 34 to pass through it; but is not shaped to latch onto the rotatable shaft 36. Therefore, the background member 30 remains stationary and does not rotate with the rotatable shaft 36. The slit 50 is sized to allow a portion of the rotatable colored disk 28 to pass in front of the background member 30 to become visible and indicate elapsed or remaining time.

Another component of the slotted timer 10 is a positioner 54 secured to the rotatable shaft 36 of the control module 34. By rotating the positioner 54 manually in a direction opposite to the direction of rotation of the rotatable shaft 36 and colored disk 28, a user may set the time to elapse. In the embodiment illustrated, the rotatable shaft 36 is rotated in a clockwise direction by the control module 34, and the positioner 54 may be manually rotated by a user in a counterclockwise direction. As best shown in FIGS. 5B and 5C, the positioner 54 has a pointer 56 which points to the traveling edge 58 of the colored disk 28. The positioner 54 rotates with the colored disk 28, the pointer 56 of the positioner 54 constantly traveling with the traveling edge 58 of the colored disk 28.

In some embodiments of timer, a positioner is not secured to the rotatable shaft 36 of the control module 34. A positioner is instead formed outside of the traveling edge 58 of the colored disk 28. Such a positioner is shown in U.S. Design patent application Ser. No. 29/719,897 filed Jan. 8, 2020, which is fully incorporated by reference herein.

As best shown in FIG. 4, magnets 60 may be secured to the generally rectangular rear tray 16 in any known manner. In some embodiments, the magnets are omitted; in other embodiments they may be other shapes and/or sizes.

Similarly, as best shown in FIG. 4, the slotted timer 10 may have retractable legs 62. In some embodiments, the legs are omitted; in other embodiments they may be other shapes and/or sizes.

Figure 5:
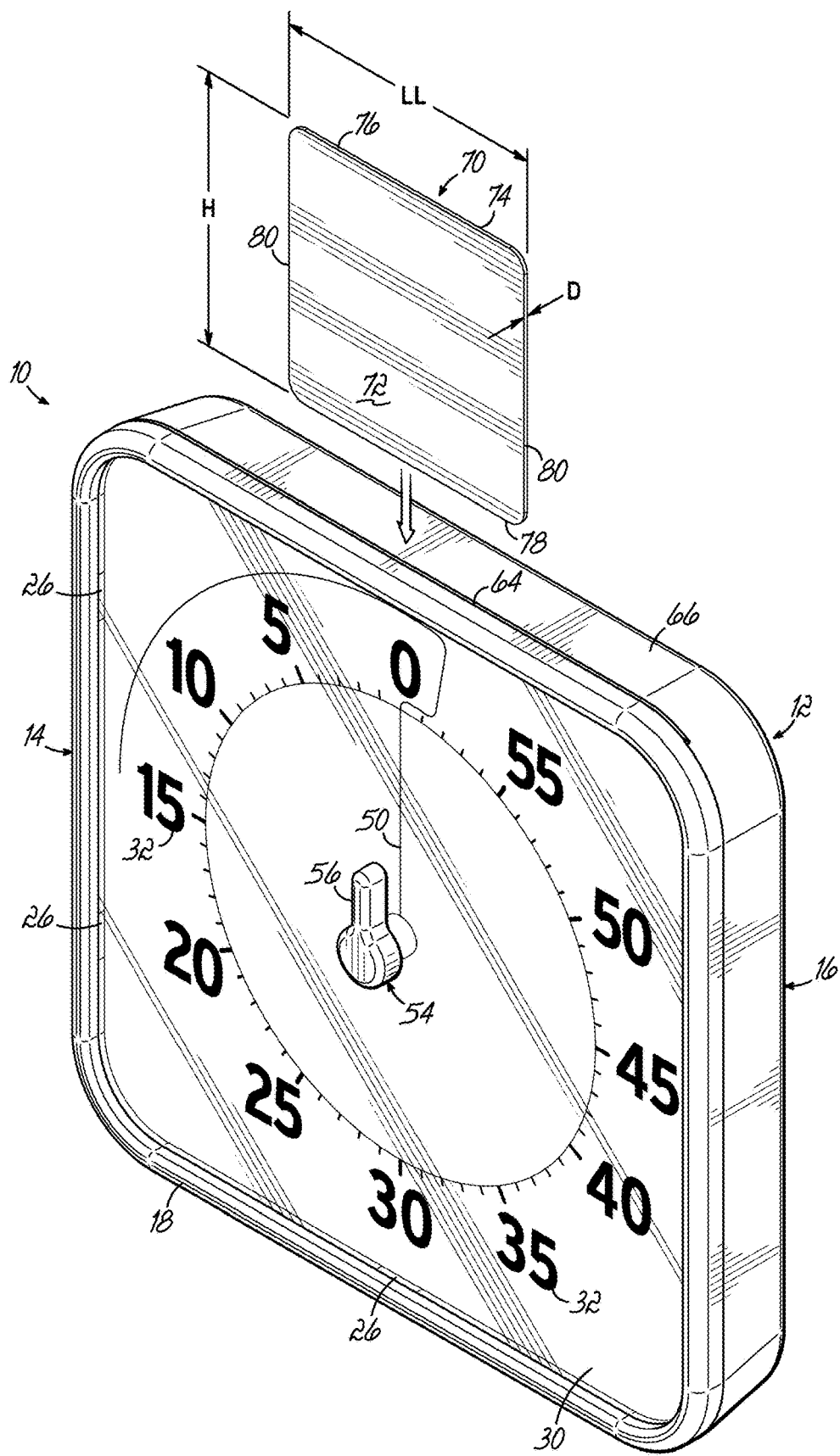
FIG. 5 is a front view of the slotted timer of FIG. 1 showing a card being inserted into the slot of the slotted timer.

As best illustrated in FIGS. 1 and 5, the generally rectangular body 12 of the slotted timer 10 has a slot 64 extending along an upper surface 66 thereof. As best shown in FIG. 1, the slot 64 has a length "L". Although the slot 64 is illustrated being linear, it may be any desired shape. The purpose of the slot 64 is to receive and retain a card 70 therein, such that the card 70 is vertically oriented and visible to the user of the slotted timer. See FIGS. 5A and 5B. The slot 64 is illustrated being between the front and rear generally rectangular trays 14, 16. However, the slot may be integrally formed in either one of the front and rear generally rectangular trays 14, 16. The slot 64 is wider than the interface between the front and rear generally rectangular trays 14, 16 and is sized to be equal or slightly larger than the depth "D" of the card 70.

Figure 5A:
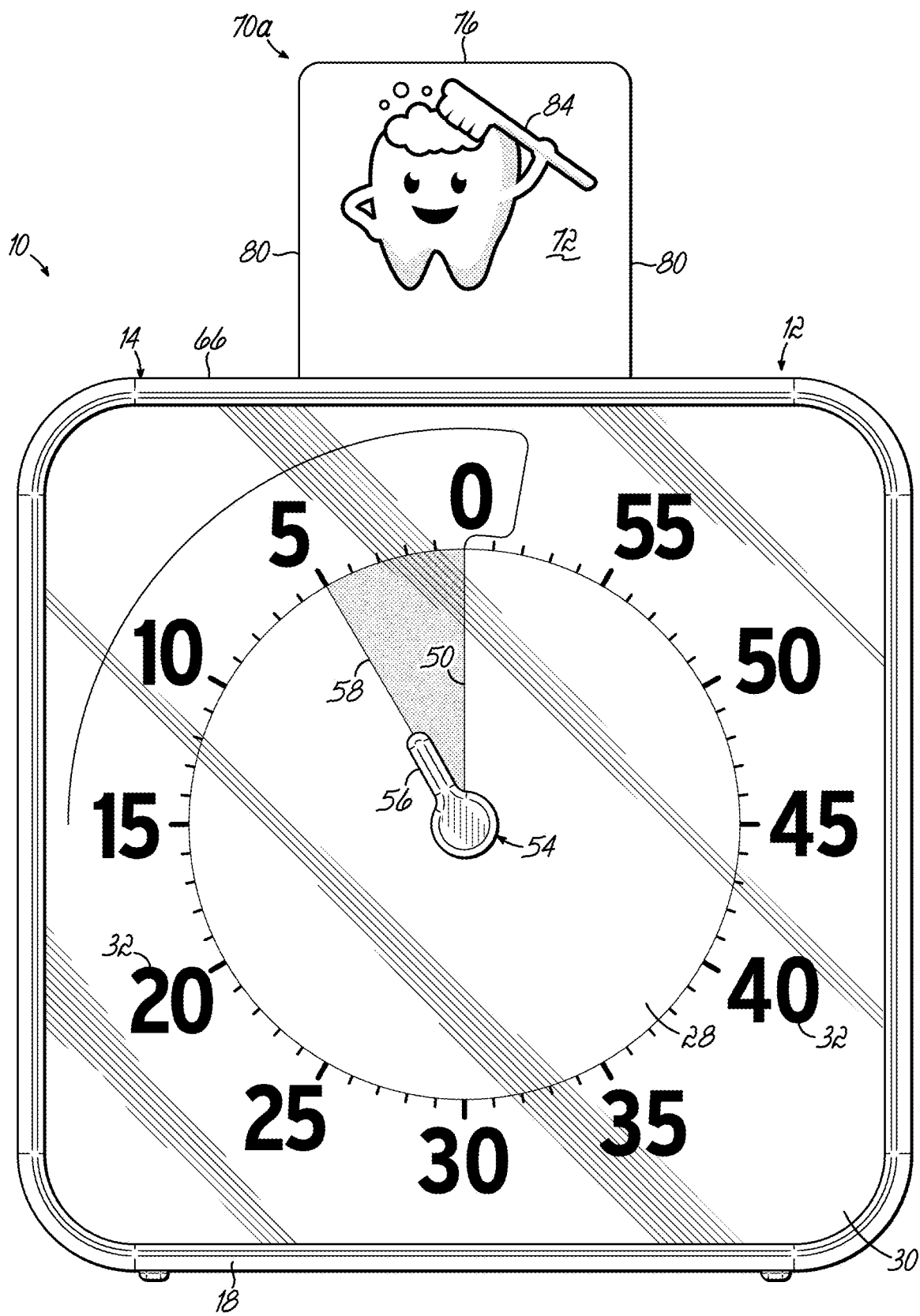
FIG. 5A is a front view of the slotted timer of FIG. 1 showing the card in the slot of the slotted timer.
Figure 5B:
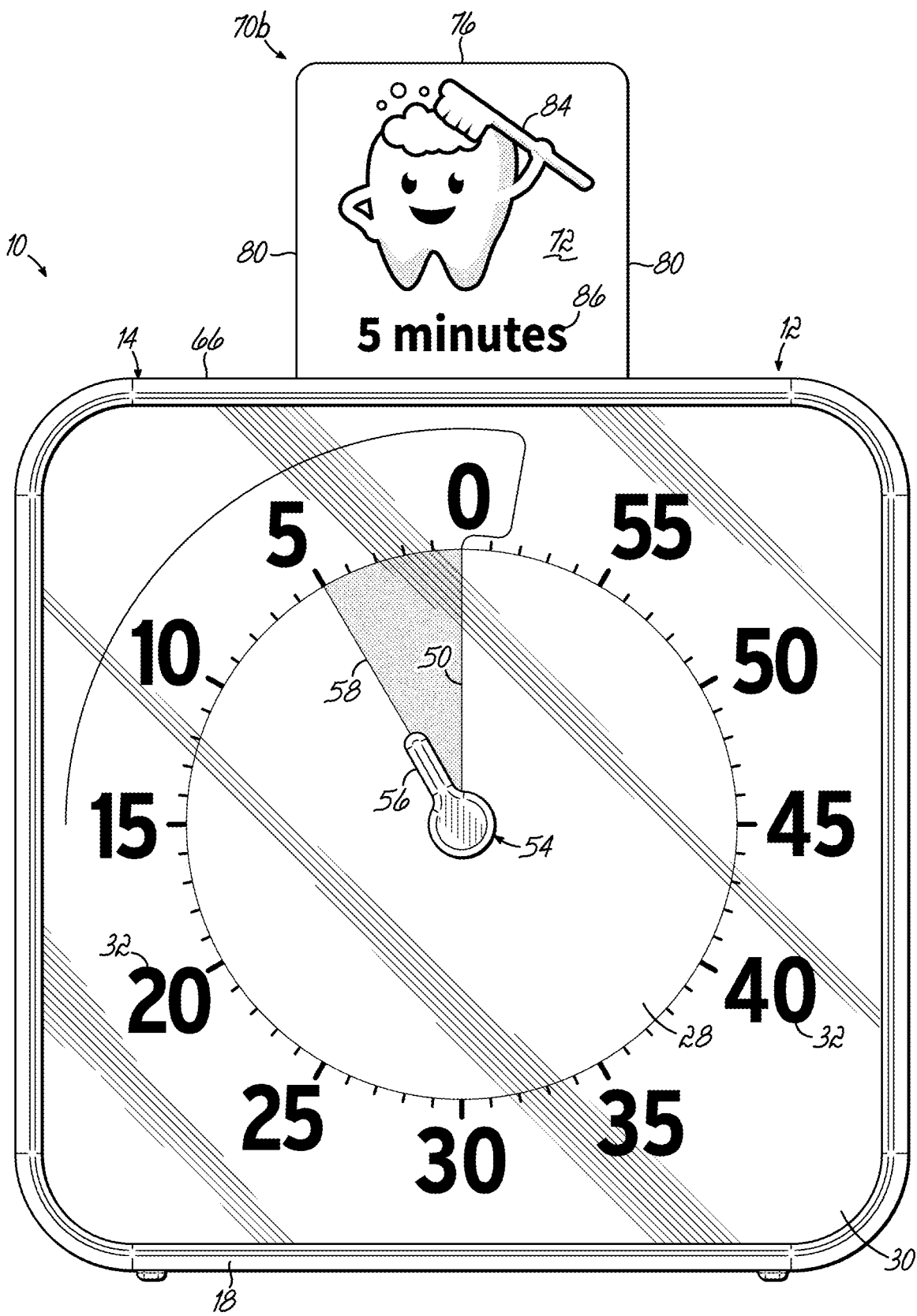
FIG. 5B is a front view of the slotted timer of FIG. 1 showing a different card in the slot of the slotted timer.
Figure 5C:
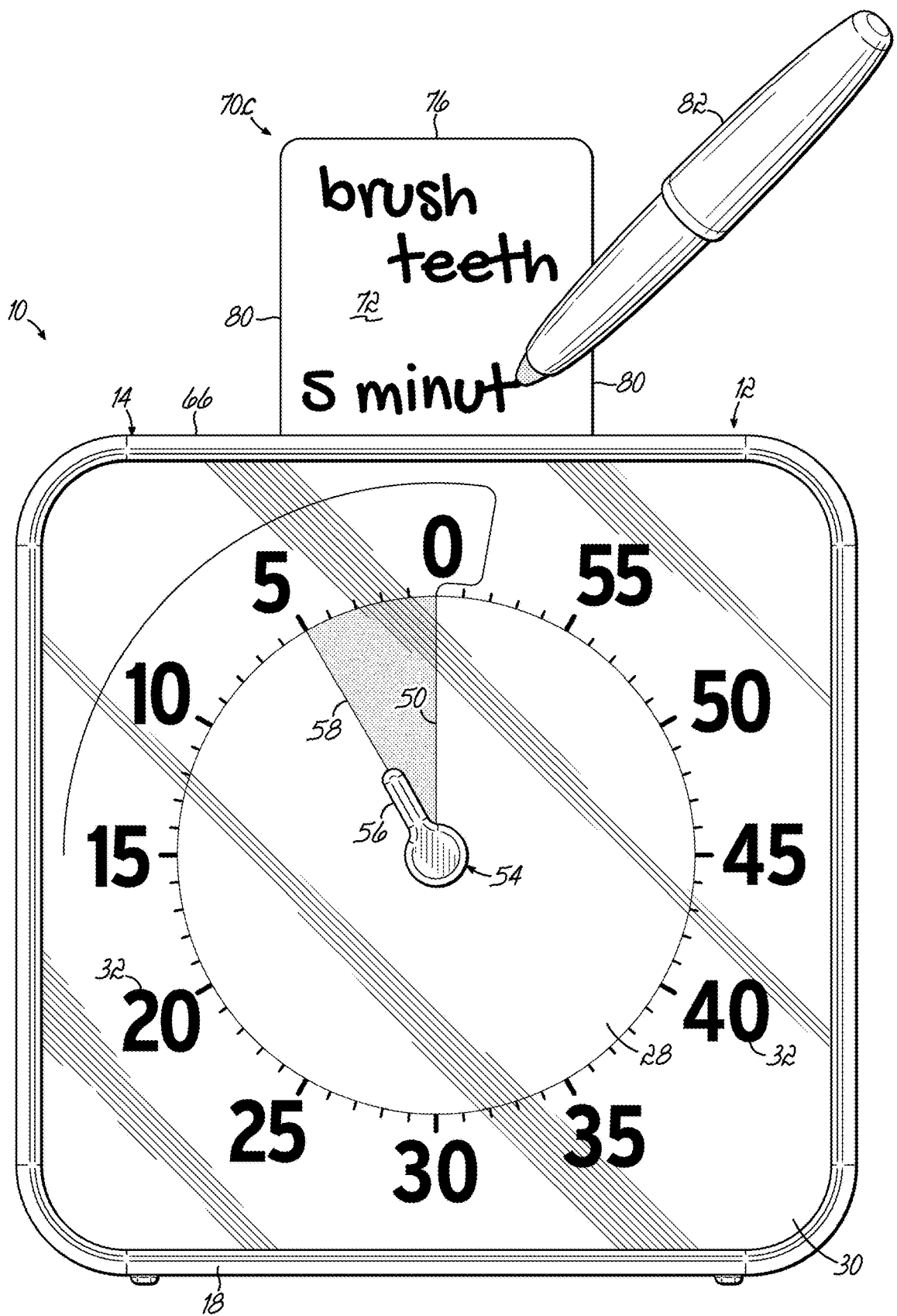
FIG. 5C is a front view of the slotted timer of FIG. 1 showing a different card in the slot of the slotted timer.
Figure 5D:
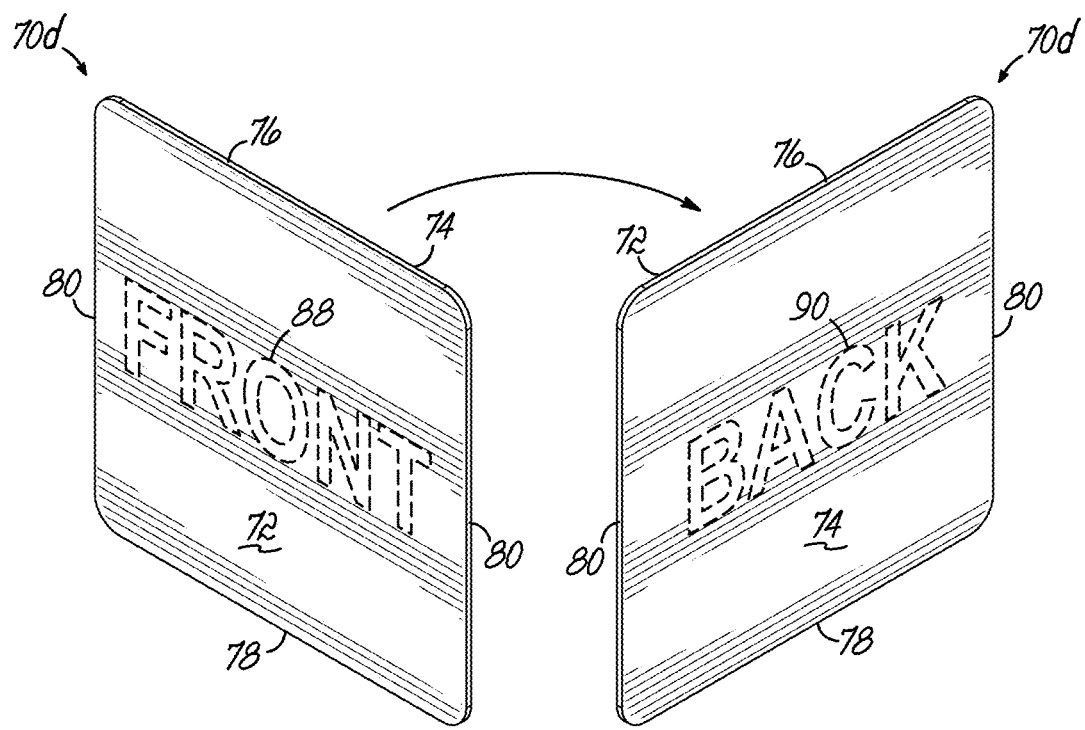
FIG. 5D is a perspective view of a two-sided card which may be used with the slotted timer of FIG. 1.

As shown in FIGS. 5 and 5D, each of the illustrated cards has a front surface 72, a rear surface 74, an upper edge 76, a lower edge 78 and two side edges 80. As shown in FIG. 5, the linear distance between the side edges 80 defines the length "LL" of the card and the linear distance between the upper and lower edges, 76, 78 defines the height "H" of the card. In one embodiment, the height H of the card is three inches and the length LL of the card is three inches. However, any of the cards illustrated or described herein may have any desired dimensions and need not be square. FIG. 5 shows a card 70 having a blank front surface 72. This card 70 may be made of any desired material, including material which may be drawn upon.

Although the illustrated cards, including card 70, have a length LL less than the length L of the slot 64, any one of the cards illustrated or described herein may have any desired length. The drawings of the card size are intended to be limiting. As best shown in FIG. 5, in the illustrated embodiments, the length of each of the cards is shorter or less than the length of the slot 64 of the timer 10.

FIG. 5A illustrates a card 70a having an image 84 of a tooth and toothbrush to illustrate that the time set by the operator, five minutes, is the time a person, such as a young child, has to brush his or her teeth. When the colored disk 28 disappears from view behind the background member 30, the toothbrushing should stop. The image 84 on the card 70a conveys to the operator how long the task should take and to which initial time the slotted timer 10 should be set. The image 84 conveys to the person setting the slotted timer 10 where to position the traveling edge 58 of the colored disk 28 using the positioner 54. Different cards may have different images representing different activities. It is up to the operator where to set the positioner 54 depending upon how long the operator believes the task illustrated by image 84 may take.

Other cards, such as card 70b shown in FIG. 7B, may have a digital time or time 86 written on the card to assist the operator where to initially position the positioner 54.

FIG. 5C shows another card 70c, which may be made of a material like a dry erase board, such that a user may draw an image on the front surface 72 thereof with an instrument 82. The operator may later erase the image, which may include a time and draw a new image or time or combination thereof.

FIG. 5D illustrates both sides of a double-sided card 70d which an image 88 shown in dashed lines on the front surface 72 of card 70d and another image 90 shown in dashed lines on the rear surface 74 of card 70d. Although the images 88, 90 are shown in dashed lines, they may be any images or times or combinations thereof and need not be shown in dashed lines.

Figure 5E:
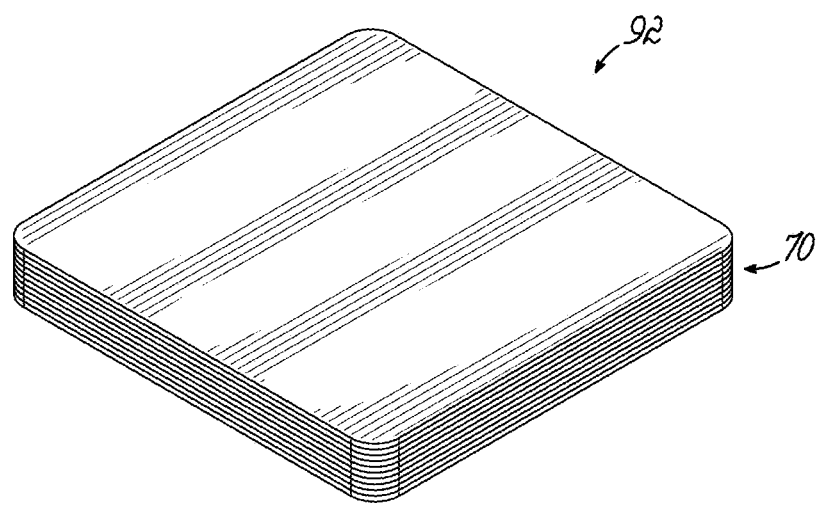
FIG. 5E is a perspective view of a stack of cards which may be sold with the slotted timer of FIG. 1.

FIG. 5E illustrates a stack 92 of cards 70, which may be sold with the slotted timer 10 or separately. Although a stack 92 of cards 70 is shown, any of the cards shown or described herein of any size may be sold in multiples in a stacked arrangement.

Figure 5F:
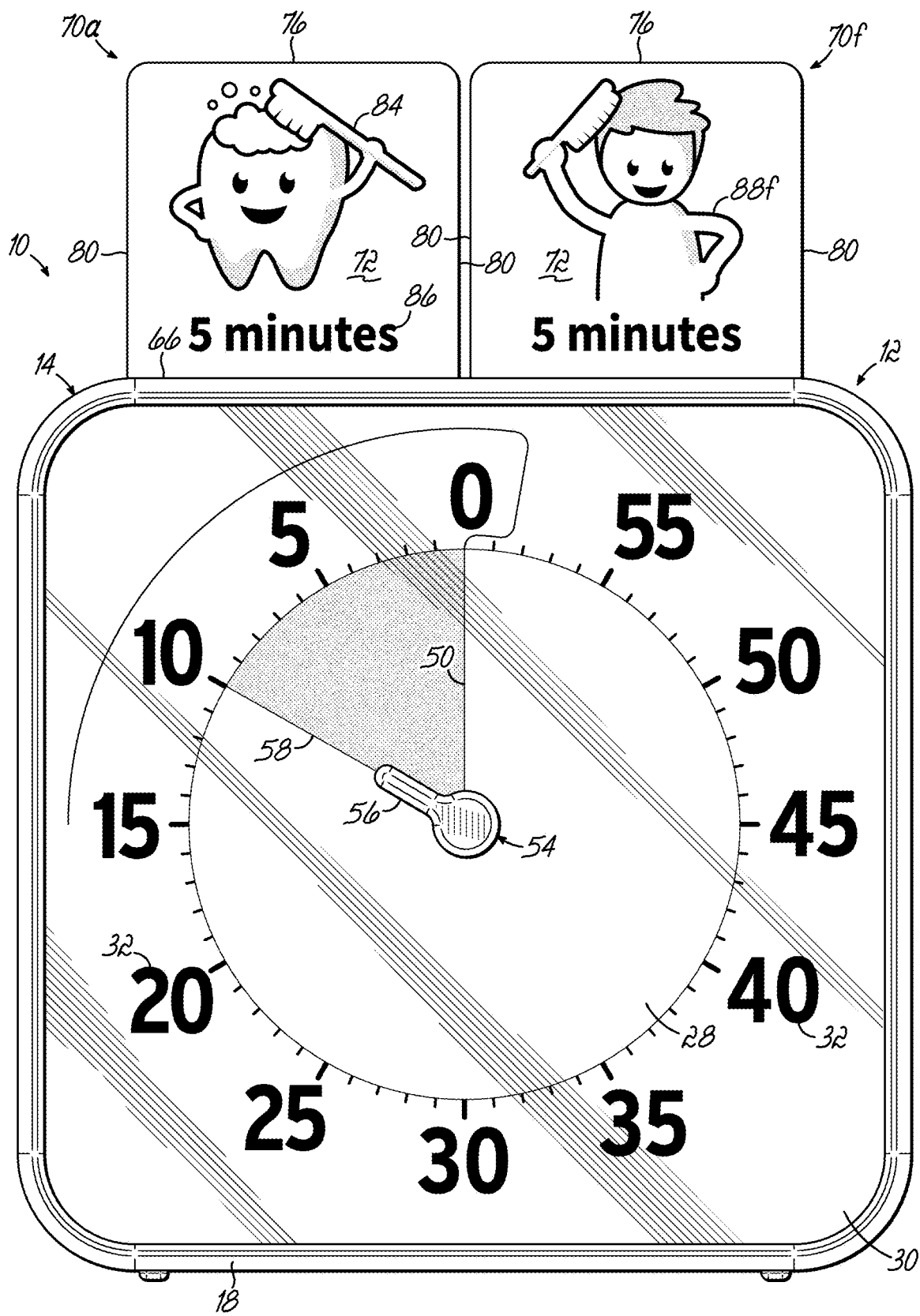
FIG. 5F is a front view of the slotted timer of FIG. 1 showing two different cards in the slot of the slotted timer.

FIG. 5F illustrates two cards 70b and 70f held upright by the slot 64 of the slotted timer 10, such that they are easily visible to a user. One of the cards is identical to card 70b shown in FIG. 7B. The second card is a card 70f which shows an image 88f of a person combing his/her hair. The term "5 minutes" is below the image 88f. Therefore, when both cards 70b and 70f are inserted into slot 64 beside each other, an operator may set the positioner 54 at ten minutes, indicating the sum of time it takes a person to complete the tasks on each displayed card 70b and 70f. This is merely one example. The numbers of combinations are endless. The number of cards displayed may be any number depending upon the size of the cards and the size of the slot in the timer. The illustrations are not intended to be limiting.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the faces of the boards may show different time periods than those illustrated. The invention resides in each individual feature described herein, alone, and in all combinations of any and all of those features. Accordingly, the scope of the invention shall be limited only by the following claims and their equivalents.

What is claimed is:

1. A slotted timer for displaying remaining and elapsed time comprising:
    a generally rectangular body comprising a generally rectangular front tray and a generally rectangular rear tray secured to the generally rectangular front tray, the generally rectangular front tray having a recess, the generally rectangular body having two retractable legs hingedly moveable between a retracted position and an extended position behind the generally rectangular body;
    a control module located between the generally rectangular front and rear trays of the generally rectangular body, the control module including a rotatable shaft,
    a colored disk secured to the rotatable shaft such that the colored disk rotates with the shaft;
    a background member located in the recess of the generally rectangular front tray and having numerical indicia marks printed thereon, the background member having a slit through which a portion of the colored disk passes such that upon rotation of the shaft a portion of the colored disk rotates in front of the background member;
    a slot extending along an upper surface of the generally rectangular body, the slot being adapted to removably receive and retain a card which is not connected to the operation of the timer; and
    a positioner for manually setting a traveling edge of the colored disk.

2. The slotted timer of claim 1, wherein the card is generally rectangular.

3. The slotted timer of claim 1, wherein the colored disk rotates in a clockwise direction as time elapses.

4. The slotted timer of claim 1, wherein the card has an illustration thereon indicating an activity.

5. The slotted timer of claim 1, wherein the card has a time printed thereon.

6. The slotted timer of claim 1, wherein the card is double-sided.

7. The slotted timer of claim 1, wherein the card is a dry erase board.

8. A slotted timer for displaying remaining and elapsed time comprising:
    a generally rectangular body comprising a generally rectangular front tray and a generally rectangular rear tray secured to the generally rectangular front tray, the generally rectangular front tray having a recess, the generally rectangular body having a battery compartment for storing at least one battery and two retractable legs moveable between a retracted position and an extended position behind the generally rectangular body;

a control module powered by said at least one battery and including a rotatable shaft, a colored disk secured to the rotatable shaft such that the colored disk rotates with the shaft;

a background member located in the recess of the generally rectangular front tray and having numerical indicia marks printed thereon, the background member having a slit through which a portion of the colored disk passes such that upon rotation of the shaft a portion of the colored disk rotates in front of the background member;

a slot extending along an upper surface of the generally rectangular body between the front and rear trays of the rectangular body, the slot being adapted to removably receive and retain a card which is not connected to the operation of the timer; and a positioner for manually setting a traveling edge of the colored disk.

9. The slotted timer of claim 8, wherein the colored disk rotates in a clockwise direction as time elapses.

10. The slotted timer of claim 8, wherein the card has an illustration thereon indicating an activity.

11. The slotted timer of claim 8, wherein the card has a time printed thereon.

12. The slotted timer of claim 8, wherein the card is double-sided.

13. The slotted timer of claim 8, wherein the card is a dry erase board.

14. A slotted timer for displaying remaining and elapsed time comprising:

a generally rectangular body comprising a generally rectangular front tray and a generally rectangular rear tray secured to the generally rectangular front tray, the generally rectangular front tray having a recess, the generally rectangular body having a battery compartment for storing at least one battery and two retractable legs moveable between a retracted position and an extended position behind the generally rectangular body;

a control module located between the generally rectangular front and rear trays of the generally rectangular body, the control module being powered by said at least one battery and including a rotatable shaft, a colored disk secured to the rotatable shaft such that the colored disk rotates with the shaft;

a background member located in the recess of the generally rectangular front tray and having indicia marks printed thereon, the background member having a slit through which a portion of the colored disk passes such that upon rotation of the shaft a portion of the colored disk rotates in front of the background member;

a slot extending along an upper surface of the generally rectangular body, the slot being adapted to removably receive and retain a card which is not connected to the operation of the timer; and a positioner for manually setting a traveling edge of the colored disk.

15. The slotted timer of claim 14, wherein the card is generally rectangular.

16. The slotted timer of claim 14, wherein the colored disk rotates in a clockwise direction as time elapses.

17. The slotted timer of claim 14, wherein the card has an illustration thereon indicating an activity.

18. The slotted timer of claim 14, wherein the card has a time printed thereon.

19. The slotted timer of claim 14, wherein the card is double-sided.

20. The slotted timer of claim 14, wherein the indicia marks are numerical.

* * * * *